US008250367B2

(12) United States Patent (10) Patent No.: US 8,250,367 B2
Broker et al. (45) Date of Patent: Aug. 21, 2012

(54) CRYPTOGRAPHIC APPLICATIONS OF EFFICIENTLY EVALUATING LARGE DEGREE ISOGENIES

(75) Inventors: Reinier M. Broker, Woodinville, WA (US); Denis X Charles, Redmond, WA (US); Kristin E. Lauter, La Jolla, CA (US)

(73) Assignee: Microsoft Corporation, Redmond, WA (US)

( * ) Notice: Subject to any disclaimer, the term of this patent is extended or adjusted under 35 U.S.C. 154(b) by 820 days.

(21) Appl. No.: 12/242,801

(22) Filed: Sep. 30, 2008

(65) Prior Publication Data

US 2010/0082992 A1 Apr. 1, 2010

(51) Int. Cl.
*H04L 9/30* (2006.01)
(52) U.S. Cl. .............................. 713/176; 380/30; 726/1
(58) Field of Classification Search .................... 380/30; 713/176; 726/1
See application file for complete search history.

(56) References Cited

U.S. PATENT DOCUMENTS

| 6,910,058 | B2 | 6/2005 | Futa et al. |
| 7,209,555 | B2 | 4/2007 | Futa et al. |
| 2005/0094806 | A1 | 5/2005 | Jao et al. |
| 2006/0129800 | A1 | 6/2006 | Lauter et al. |
| 2006/0177051 | A1 | 8/2006 | Lauter et al. |
| 2006/0248338 | A1 | 11/2006 | Jao et al. |
| 2007/0165843 | A1 | 7/2007 | Lauter et al. |

OTHER PUBLICATIONS

Duke et al. The Splitting of Primes in Division Fields of Elliptic Curves. Published 2002 in Experimental Mathematics vol. 11, Issue 4, p. 555-565. 11 pages.*
Boneh, et al, "Short Signatures from the Weil Pairing", retrieved at <<http://www.iacr.org/archive/asiacrypt2001/22480516.pdf>>, Computer Science Department, Stanford University, pp. 516-534.
Bostan, et al, "Fast Algorithms for Computing Isogenies between Elliptic Curves", retrieved at <<http://arxiv.org/PS_cache/cs/pdf/0609/0609020v1.pdf>>, Feb. 1, 2008, pp. 1-28.
Broker, et al, "Constructing Elliptic Curves of Prime Order", retrieved at <<http://arxiv.org/PS_cache/arxiv/pdf/0712/0712.2022v1.pdf>>, 2000 Mathematics Subject Classification, 2000, pp. 1-13.
Galbraith, et al, "Algebraic Curves and Cryptography", retrieved at <<http://www.cacr.math.uwaterloo.ca/techreports/2005/cacr2005-02.pdf>>, Jan. 12, 2005, pp. 1-34.
Jao,"Use of Isogenies for Design of Cryptosystems", retrieved Jul. 10, 2008 at <<http://www.freepatentsonline.com/EP1528705.html>>, FreePatentsOnline.com, 2004-2008, pp. 1-19.

(Continued)

*Primary Examiner* — Brandon Hoffman
(74) *Attorney, Agent, or Firm* — Lee & Hayes, PLLC

(57) ABSTRACT

Techniques are disclosed for representing and evaluating large prime degree isogenies for use in cryptographic signature and encryption schemes. An isogeny of prime degree 1 may be represented as an ideal in the form (1, A*alpha+B), where 1 comprises the degree of a prime number, the prime number is split into integers a and b, and alpha is a known endomorphism. For a given degree 1, integers a and b define a unique isogeny, allowing the isogeny to be stored with 3 log(1) bits of information. Techniques are also disclosed to evaluate the isogeny at a given point by decomposing the isogeny into an integer and a plurality of smaller degree isogenies, evaluating the smaller degree isogenies at the point with traditional means, and multiplying the results of the evaluations together and with the integer.

19 Claims, 8 Drawing Sheets

OTHER PUBLICATIONS

Konstantinou, et al, "On the Construction of Prime Order Elliptic Curves", retrieved at <<http://www.ceid.upatras.gr/faculty/zaro/pub/indocrypt2003-prime-order-ec.pdf>>, Springer-Verlag, 2003, pp. 309-322.

Menezes, "Evaluation of Security Level of Cryptography: The Elliptic Curve Discrete Logarithm Problem (ECDLP)", retrieved at <<http://www.ipa.go.jp/security/enc/CRYPTREC/fy15/doc/1028_ecdlp.pdf>>, University of Waterloo, Dec. 14, 2001, pp. 1-23.

Miyaji, et al, "New Explicit Conditions of Elliptic Curve Traces for FR-Reduction", retrieved at <<https://dspace.jaist.ac.jp/dspace/bitstream/10119/4432/1/73-48.pdf>>, IEICE Trans. Fundamentals, vol. E84-A, No. 5, May 2001, pp. 1234-1243.

Paterson, "Cryptography from Pairings", retrieved at <<http://www.isg.rhul.ac.uk/~kp/pairingschapter.pdf>>, pp. 205-269.

Rubin, et al, "Supersingular Abelian Varieties in Cryptology", retrieved at <<http://www.math.uci.edu/~asilverb/bibliography/ssays.pdf>>, Department of Mathematics, Ohio State University, pp. 1-8.

Watkins, "Computing the Modular Degree of an Elliptic Curve", retrieved at <<http://www.emis.de/journals/EM/expmath/volumes/11/11.4/pp487_502.pdf>>, Experimental Mathematics 11:3, 2000, pp. 487-502.

* cited by examiner

CRYPTOGRAPHIC APPLICATIONS OF EFFICIENTLY EVALUATING LARGE DEGREE ISOGENIES

The present application is related to the paper "Evaluating Large Degree Isogenies And Applications To Pairing Based Cryptography" by Reinier Bröker, Denis Charles, and Kristin Lauter, published by Springer-Verlag in "Lecture Notes in Computer Science", which is incorporated by reference herein for all that it teaches and discloses.

BACKGROUND

Secure digital signing and verification are often used in e-commerce, messaging, and product verification to authenticate the source of a binary object. Digital signatures schemes have been created that require a small amount of computing power to compute a signature, but a significantly greater amount of computing power to impersonate a signor of a given message. However, as computing power increases, the safety of prior digital signature algorithms is jeopardized, and new algorithms must be implemented to secure the identity of binary objects. In addition, with the advent of mobile computing devices in which computational power and battery life are at a premium, there is an increasing need for efficient and secure message signing and verification methods.

Digital encryption and decryption are similarly necessary to secure communications and transactions over electronic medium. Encryption of a digital message ensures that only the intended recipient may decrypt and read the contents of the message. For example, in asymmetric key cryptography, a message may be encrypted with a public key such that the private key corresponding to the public key is needed to decrypt the message. Thus, only the holder private key will be able to access the message.

There is an ever-increasing need to implement a variety of signature and encryption schemes, both to reduce the computational overhead necessary to perform these cryptographic functions, and to create a diverse set of signature and encryption schemes to mitigate the risk of a single scheme being broken.

One type of signature scheme currently known utilizes elliptic curves defined over a finite field. One example is the Boneh-Lynn-Schacham (BLS) signature scheme, which utilizes a single curve to sign a message. The BLS signature scheme generates two points P & Q on the curve. P is calculated by using a hashing function to hash the message onto the curve. Q is selected, possibly at random, on the curve. The signor multiplies some secret S, which is an integer of large prime degree, with the point Q to create the signature. The signor also creates a public key by multiplying the secret S by the hash of the message. P, Q, the signature, and the public key are made available for anyone to use, but the secret S is not made public.

A recipient of the message may verify the authenticity of the signor by verifying that the signature equals S times the hash of the message. This comparison is accomplished by evaluating two bilinear Weil pairings and checking for equality.

SUMMARY

Techniques are described for implementing digital signature schemes, encryption schemes, and other cryptographic operations. Specifically, certain elliptic-curve-based encryption techniques require calculating mappings, or isogenies, between two elliptic curves. In one implementation, an isogeny is represented by storing a degree of an integer of large prime degree, and two integers calculated by splitting the first integer. The isogeny may then be evaluated at the point by decomposing the isogeny into a plurality of isogenies of smaller degree and a fourth integer, evaluating the plurality of isogenies at the point, and then multiplying the evaluations of the plurality of isogenies and the fourth integer together.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), and/or computer-readable instructions as permitted by the context above and throughout the document.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

The following discussion targets techniques for improving public-key systems that utilize one or more elliptic curves. One signature scheme utilizes two elliptic curves instead of one, and utilizes an isogeny to map a first curve to a second curve. In one embodiment, the isogeny is the secret used to sign the message, analogous to the secret integer S of the BLS signature scheme mentioned above. In practice, this signature scheme has determined an isogeny. The hardness of breaking the two curve scheme is an extension of the hardness of breaking the BLS scheme, where the signature is calculated by multiplying an integer S by a point Q.

Signature schemes typically utilize some secret data, and publish some public data related to the secret data. Using the public data, anyone can verify with a high probability that the message was signed with private data related to the public data, thus authenticating the signor.

Isogenies of large degree are more secure than isogenies of a small degree. Prior curve-based systems have represented an isogeny by multiplying a small degree isogeny with a large square number, resulting in an isogeny of large degree. This solution may be improved by directly storing a large prime degree isogeny. In accordance with this improvement, this document describes techniques for representing and evaluating isogenies (mappings) between elliptic curves. When represented as a polynomial, an isogeny of degree $2^{160}$ requires $160^2$ bits to be stored. One of the concepts disclosed below discusses a system for representing an isogeny of degree $2^{160}$ with $3 \log(2^{160})$ bits (around 500 bits). For instance, an isogeny of degree $2^{160}$ may be represented by an ideal L comprising three integers 1, a, and b, each requiring $\log(2^{160})$ bits of storage. For example, L=(1, a*alpha+b).

L may be evaluated by decomposing the large degree isogeny into a plurality of smaller degree isogenies p1 ... pn, each of a degree such they may efficiently be evaluated, and an integer t. L may be evaluated at a point on the first curve by evaluating each of the plurality of smaller degree isogenies at that point, multiplying the results together, and then multiplying the results with the integer t. Isogenies are used as secret or private information because evaluating L at a point on the first curve quickly produces a point on the second curve, but given the point on the second curve it is exceedingly difficult to deduce the point on the first curve without knowing the secret isogeny.

Figure 1:
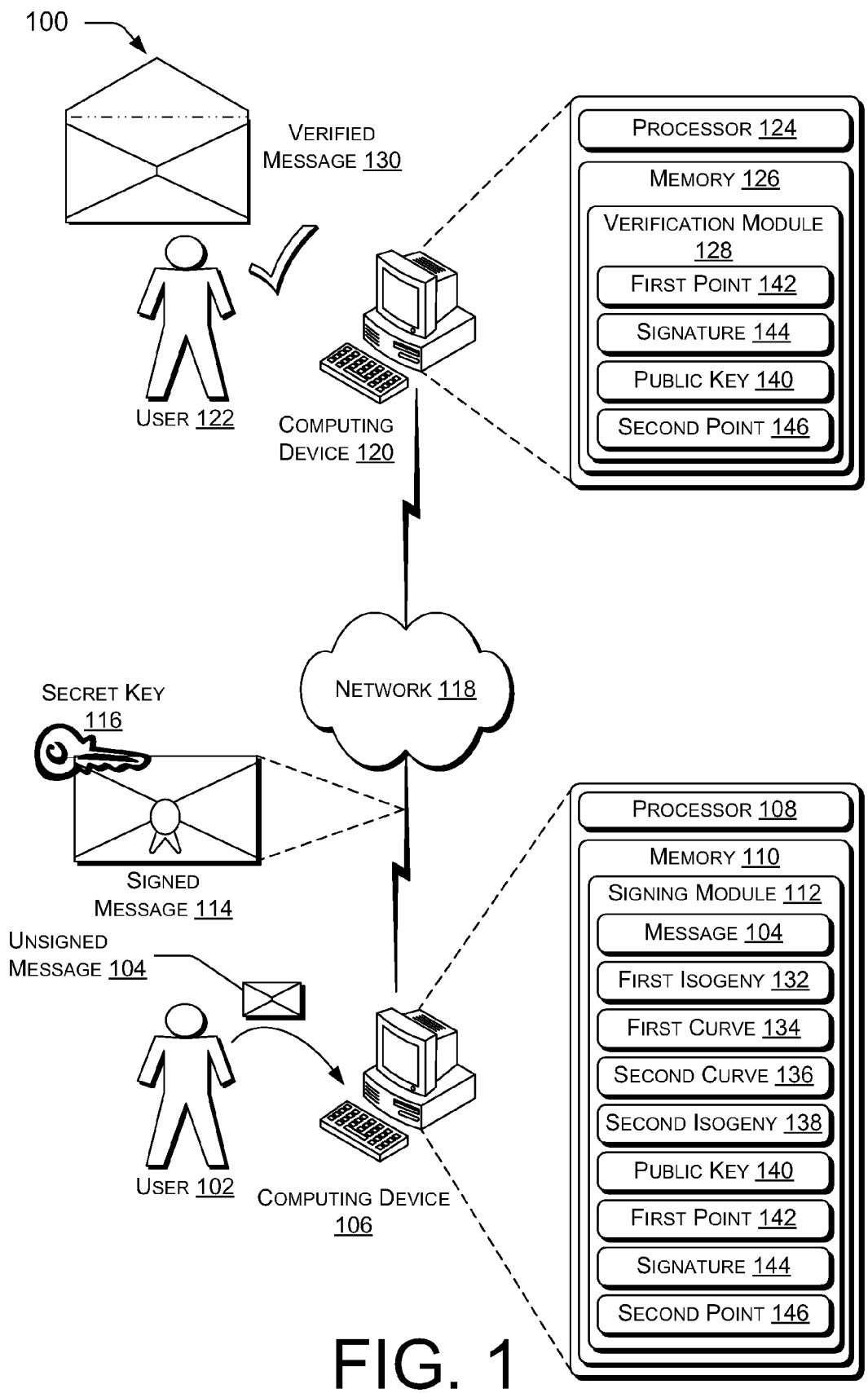
FIG. 1 depicts an illustrative architecture for generation and validation of signatures with an isogeny.

FIG. 1 illustrates an exemplary curve-based signature scheme architecture 100. A user 102 may generate an unsigned message 104 on a computing device 106. The unsigned message may be an email, word processing document, a file, or any other data. The computing device comprises a processor 108 and a memory 110. In one embodiment, the computing device 106 may be a desktop computer, however the computing device 106 may instead comprise a server computer, a laptop computer, a cell phone, Personal Digital Assistant, or any other device capable of computing the calculations necessary to implement the scheme described below.

The computing device 106 comprises a signing module 112 stored in the memory 110. The signing module 112 may receive the unsigned message 104 and generate a signed message 114 with a secret key 116. The signed message 114 and some public data associated with the secret key 116 may be transmitted through a network 118 to a computing device 120 operated by a user 122. The computing device 120 may comprise a processor 124 and a memory 126, with the memory 126 comprising a verification module 128. In one embodiment, the verification module 128 may utilize the public data associated with the secret key 116 to calculate whether the signed message 114 was actually signed with the secret key 116. If the signature is determined to be valid, the verification module 128 may generate a verified message 130 for use by the user 120.

In one embodiment, the signing module 112 comprises the unsigned message 104 and a first isogeny 132 that maps a first curve 134 to a second curve 136. In one embodiment, the first curve 134 and/or the second curve 136 may comprise elliptical curves, or alternatively the first curve 134 and/or the second curve 136 may comprise curves defined by an equation $y^2=f(x)$, where $f(x)$ is a cubic polynomial with distinct roots. In one embodiment the first curve 134 and/or the second curve 136 may be defined over a finite field having a large prime characteristic.

The first isogeny 132 may comprise a large prime degree isogeny that maps the first curve 134 to the second curve 136. $2^{160}$ is a typical degree of the first isogeny 132, which implies that the first isogeny 132 may be defined by a polynomial having $2^{160}$ roots. Other degrees are contemplated, including $2^{25}$, $2^{50}$, $2^{100}$, $2^{500}$, $2^{1,000}$, $2^{10,000}$, and $2^{100,000}$, among others. When the first isogeny 132 has a degree of $2^{160}$, and is represented as a polynomial, the polynomial may comprise $2^{160}$ roots and thus may be represented by the points on the polynomial that map to a zero point on the second curve 136. However $2^{160}$ is typically far too many points to efficiently write down and evaluate.

Known algorithms to evaluate an isogeny are all exponential time algorithms (in the logarithm of the degree), and the practicality of these algorithms is therefore limited to relatively small degrees. To work-around this limitation, large degree isogenies have been previously generated by multiplying a small prime degree isogeny with a large square number. However, this method diminishes the cryptographic hardness attributed to the isogeny, because cracking the signature scheme requires determining the large square number and the small prime degree isogeny, which reduces to a traditional BLS technique that relies on multiplication of a point on a curve by a very large number.

In order to utilize an isogeny of truly large degree, the first isogeny 132 ideally is represented concisely, so that it can be efficiently stored in the memory 110. The first isogeny 132 is then evaluated with an algorithm having running time that is polynomial in the logarithm of the degree of the first isogeny 132. For instance, it would be beneficial to represent an isogeny of prime degree l with, for instance, at most $3 \log(l)$ bits, which is an improvement over known techniques such as representation by rational functions or by the "kernel polynomial", that each require roughly l bits. In one embodiment, runtime of the algorithm to evaluate the first isogeny 132 is polynomial in the class number of the endomorphism ring of the first curve 134, and is fastest when the class group is small. In one embodiment, complex multiplication techniques are used to construct the curve 134, ensuring that the class group will usually be small.

The signing module may compute a dual isogeny 138 as the dual isogneny of the first isogeny 132. The dual isogeny 138 may be, in one embodiment, represented in a similar manner as the first isogeny 132, and evaluated in a similar manner as the first isogeny 132. The dual isogeny 138 may map a point on the second curve 136 to a point on the first curve 134.

In one embodiment a public key 140 may be calculated by evaluating the first isogeny 138 at a first point 142 lying on the first curve 134. A signature 144 may then be calculated by evaluating the dual isogeny 138 a second point 146 lying on the second curve 136. The computing device 106 may make the first point 142, the second point 146, the signature 144, and the public key 140 available, typically in addition to the signed message 114, enabling the computing device 120 (and/or, potentially, any other device) to verify the authenticity of the signed message 114. Alternatively or additionally, the computing device 106 may transmit the first point 142, the second point 146, the public key 140, and the signature 144 to the computing device 120.

The computing device 120 may authenticate that the signature 144 associated with the signed message 114 was created with private data related to the first point 140, the second point 146, and the public key 140. Authentication may be achieved by evaluating two Weil pairings, and comparing the results for equality. If a Weil pairing e(the signature 144, the second point 146) equals a Weil pairing e(the first point 142, the public key 140), then the message is known to have been signed by a device storing the first curve 134. As such, the message is deemed to be "authenticated" or "verified".

Figure 2:
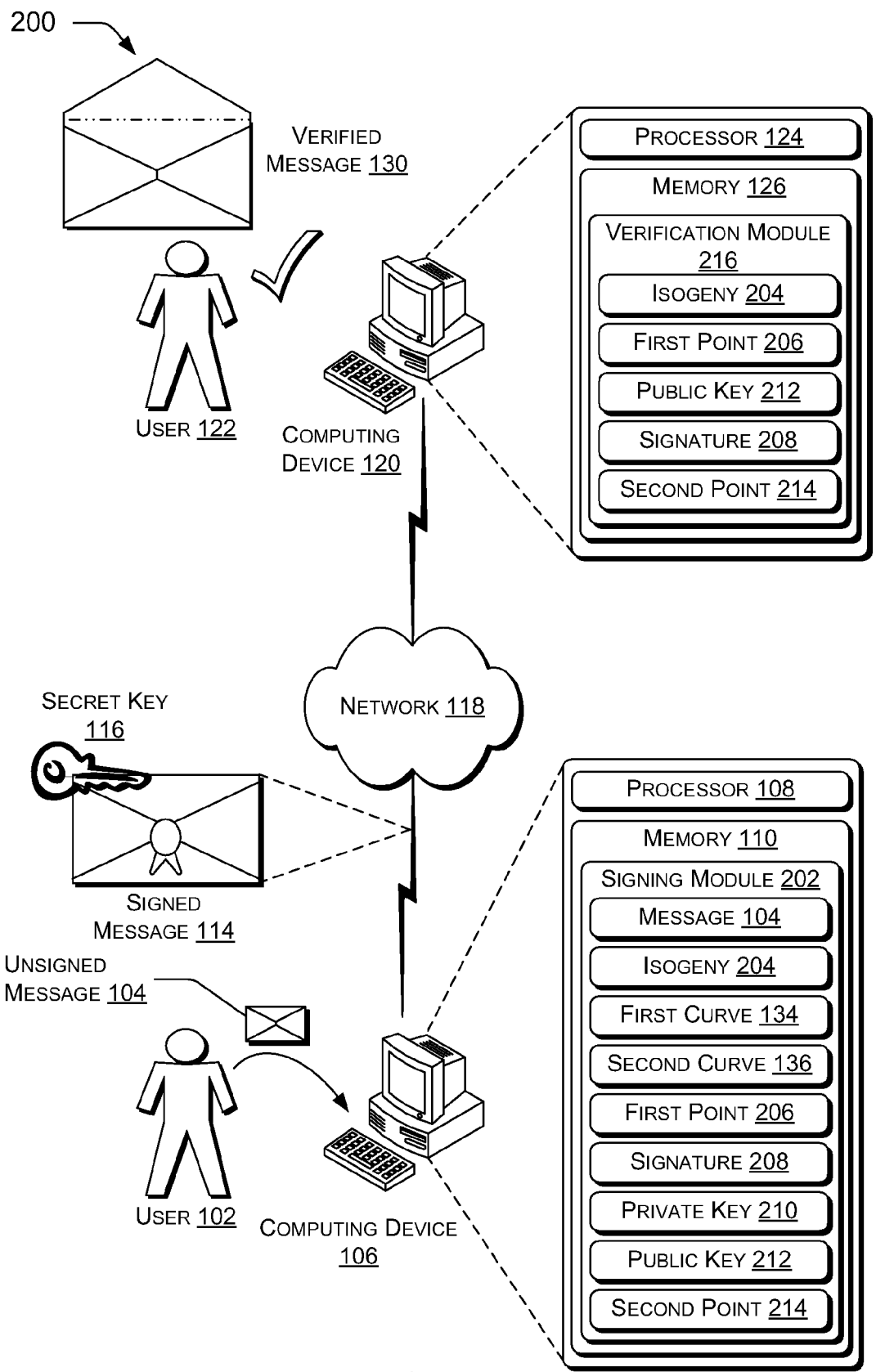
FIG. 2 depicts an illustrative architecture for verifying a message with an isogeny.

FIG. 2 illustrates an exemplary curve-based signature scheme architecture 200 utilizing a large prime degree isogeny to authenticate the signature. In one embodiment, the unsigned message 104 may be signed by a signing module 202. The signing module 202 may make publically available an isogeny 204, the first curve 134, and the second curve 136, in order to verify the signature.

The signing module 202 may sign the unsigned message 104 using an asymmetric key signature scheme, such as a public/private key signature scheme. In one embodiment, a first point 206 is calculated by hashing the unsigned message 104 onto the first curve 134. A signature 208 may be calculated by multiplying a private key 210 with the first point 206. A public key 212 may be calculated by multiplying the private key 210 with a second point 214, which in one embodiment is chosen randomly over the second curve 136. In one embodiment, the private key 210 comprises a random integer. In order to be cryptographically secure, the private key 210 may be a prime number of degree at least 2^160, although prime numbers of all sizes are also contemplated.

The signing module 202 may make available the first point 206, the public key 212, the signature 208, and the second point 214. In one embodiment, the first point 206, the public key 212, the signature 208, and the second point 214 are transmitted to the computing device 120. A verification module 216 stored in the memory 126 of the computing device 120 may authenticate that the signature 208 associated with the signed message 114 was created with the private key 210. Authentication may be achieved by evaluating two Weil pairings, and comparing the results for equality. For instance, if a Weil pairing e(the isogeny 204 evaluated at the first point 206, the public key 212) equals a Weil pairing e(the isogeny 204 evaluated at the signature 208, the second point 214), then the message is known to have been signed by a device storing the private key 210.

Figure 3:
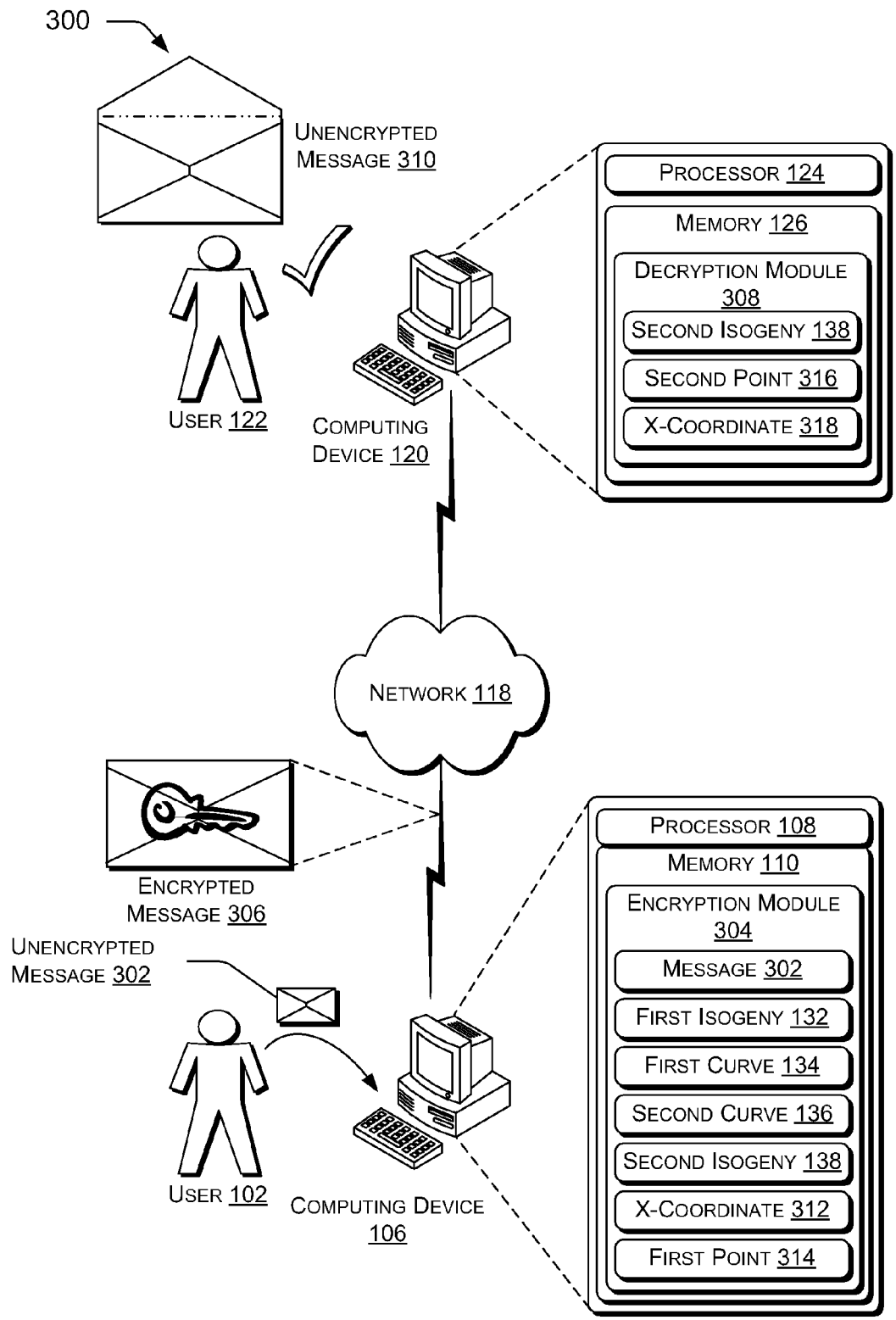
FIG. 3 depicts an illustrative architecture for encrypting and decrypting a message with an isogeny.

FIG. 3 illustrates an exemplary curve-based encryption/decryption scheme architecture 300 utilizing a large prime degree isogeny to encrypt a message. In one embodiment, an unencrypted message 302 is encrypted by an encryption module 304 that is stored in the memory 110 and executed by the processor 108. The encryption module 304 generates an encrypted message 306, which may be made available to other computing devices or which may be transmitted to the computing device 120. In one embodiment, a decryption module 308 stored in the memory 126 and executed by the processor 124 receives the encrypted message 306, and may decrypt the encrypted message to create an unencrypted message 310.

In one embodiment the unencrypted message 302 may be encrypted by hashing the unencrypted message to an x-coordinate 312 on the first curve 134. A first point 314 on the first curve 134 may be computed given the x-coordinate 312. The encrypted message 306 may be calculated by evaluating the isogeny 132 at the first point 314, and taking the x-coordinate.

In one embodiment the encrypted message 306 may be decrypted by the decryption module 308. The decryption module 308 may decrypt the encrypted message 306 by evaluating the dual isogeny 138 at a point determined from the x-coordinate, dividing the point by the degree of the isogeny, and taking the x-coordinate of the dividend as the decrypted message.

Figure 4:
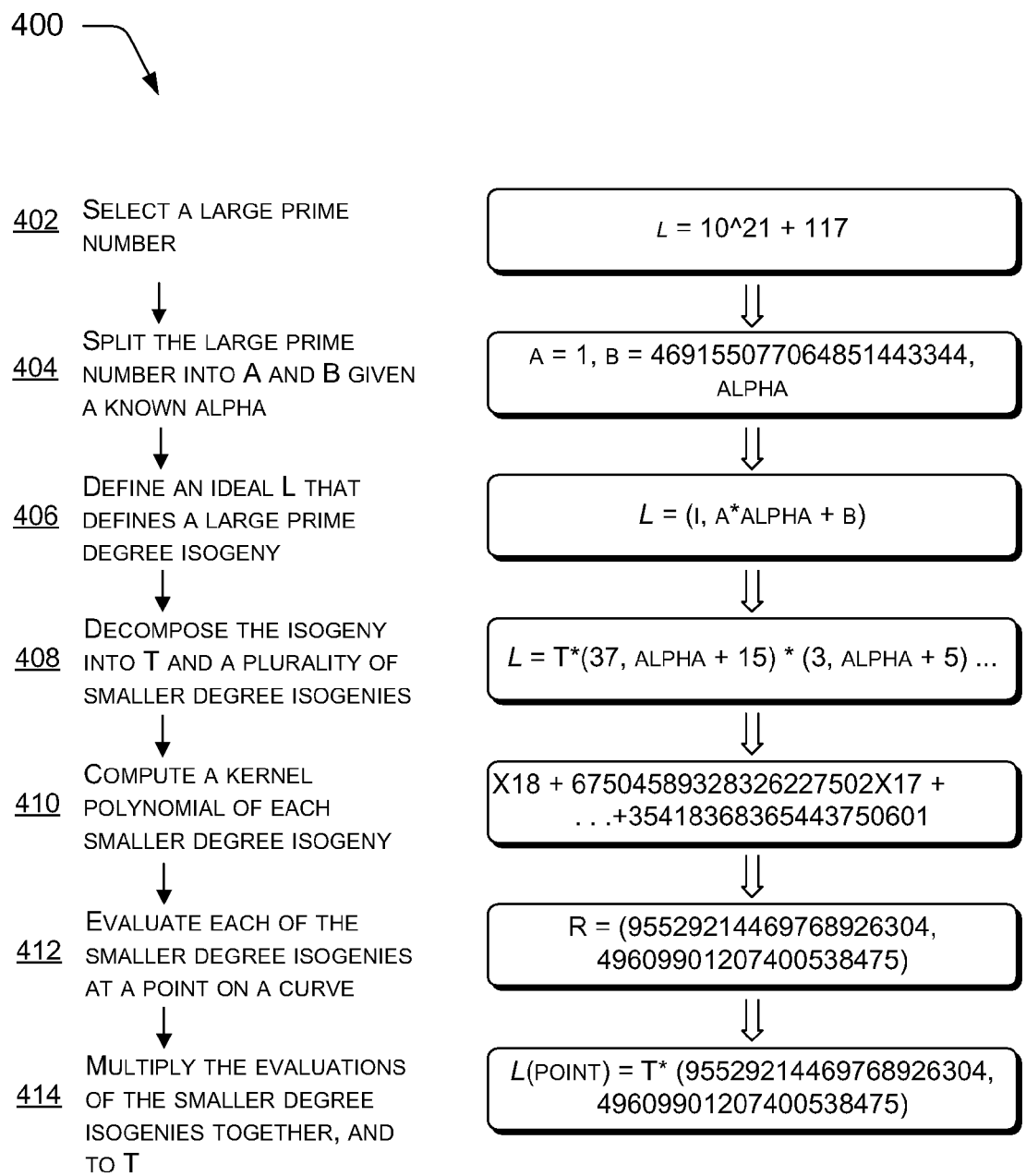
FIG. 4 depicts an illustrative process for representing and evaluating an isogeny.

FIG. 4 depicts an illustrative process 400 for representing an isogeny of large prime degree, and evaluating the isogeny of large prime degree at a point. Process 400 may be used by the signature scheme architectures 100 and 200, as well as the encryption/decryption scheme architecture 300 to represent and evaluate large prime degree isogenies.

At operation 402, a number of large prime degree l is selected. In one embodiment, the degree l of the large prime number may have a degree of at least 2^160, to ensure cryptographic hardness of the signature/encryption. Of course, l may be smaller or larger in other embodiments.

At operation 404, the number of large prime degree is split into integers A and B, given a known alpha. In one embodiment, the number of large prime degree may be split into two pairs of integers, only one of which is selected at random as A and B. In one embodiment, alpha is a constant known throughout the process.

At operation 406, a large prime degree isogeny is defined with an ideal L. In one embodiment, the ideal L may be defined as (1, A*alpha+B). A degree 1 and a pair of inters A and B may then be split from a large prime number of the degree 1 uniquely define an isogeny.

At operation 408, the isogeny L is decomposed into an integer T and a plurality of smaller degree isogenies of prime degree. In one embodiment, each of the plurality of smaller degree isogenies may be represented by an ideal as described in operation 406. At operation 410, each of the plurality of smaller degree isogenies may be converted to a polynomial representation. At operation 412, each of the smaller degree isogenies is evaluated at the point. Each of the smaller degree isogenies may be evaluated in polynomial time. At operation 414, the large prime degree isogeny is evaluated at the point by multiplying the results of evaluating each of the smaller degree isogenies at the point together, and multiplying the result by the integer T.

Figure 5:
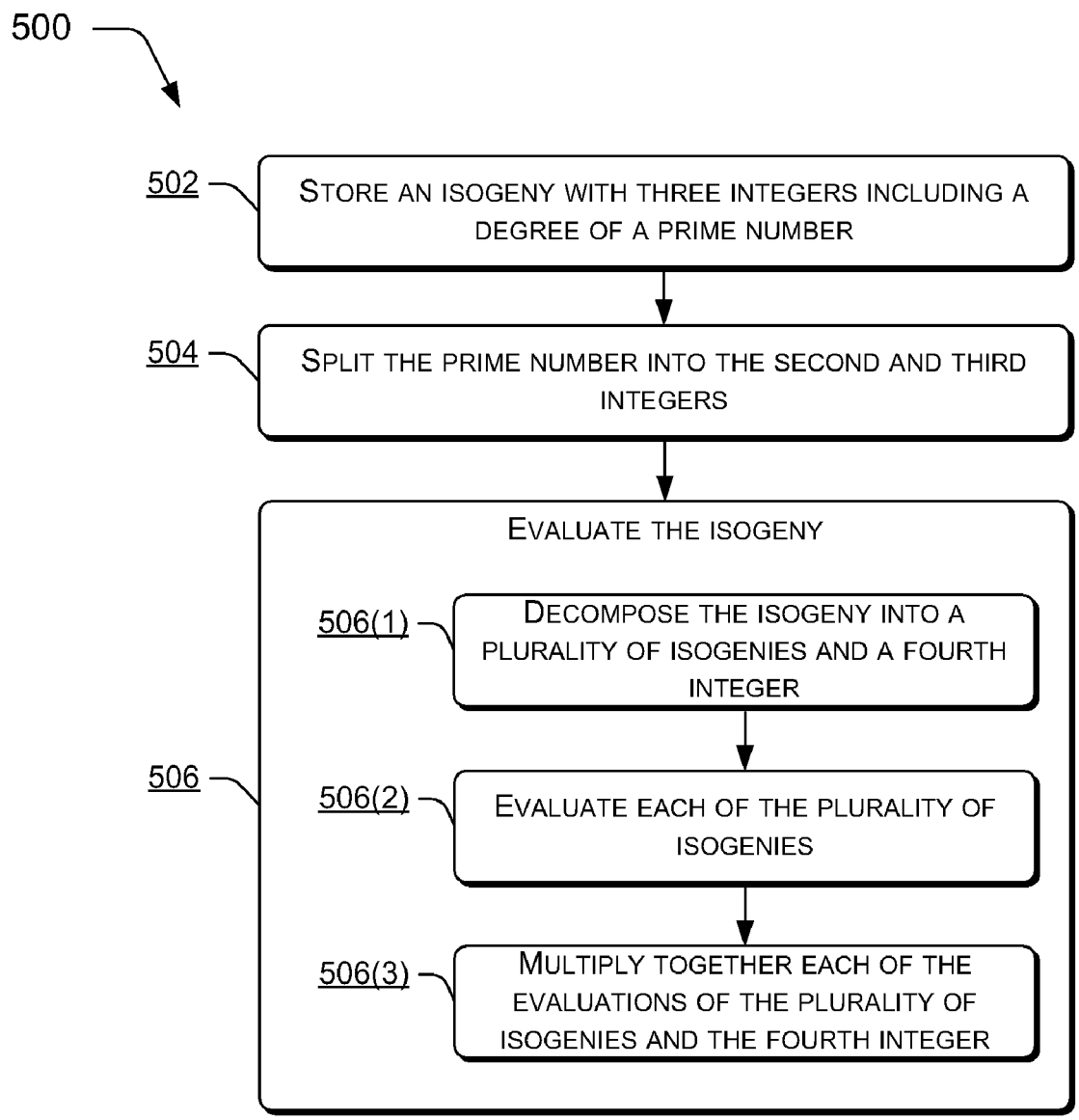
FIG. 5 depicts an illustrative process for representing and evaluating an isogeny to cryptographically sign a message

FIG. 5 depicts an illustrative process 500 for representing and evaluating an isogeny to cryptographically sign a message. At operation 502, an isogeny is represented and stored with three integers, each of degree 1, requiring 3 log(1) bits. The first of the three integers may be a prime number of degree 1. At operation 504, the prime number of degree 1 is split into a second and third integer given the constant alpha. Given alpha and the second and third integers, an isogeny of degree 1 may be uniquely defined. At operation 506, the isogeny is evaluated at the point by performing the operations 506(1) to 506(3).

At operation 506(1), the isogeny is decomposed into a plurality of isogenies and a fourth integer. In one embodiment, each of the plurality of isogenies may have relatively small prime degrees. At operation 506(2), each of the plurality of isogenies of relatively small prime degrees are evaluated. In one embodiment, these isogenies are first converted to a polynomial representation, or "kernel", before evaluation. At operation 506(3), the results of the evaluation of each of the plurality of isogenies of relatively smaller prime degree are multiplied together, and the result may be further multiplied by the fourth integer.

Figure 6:
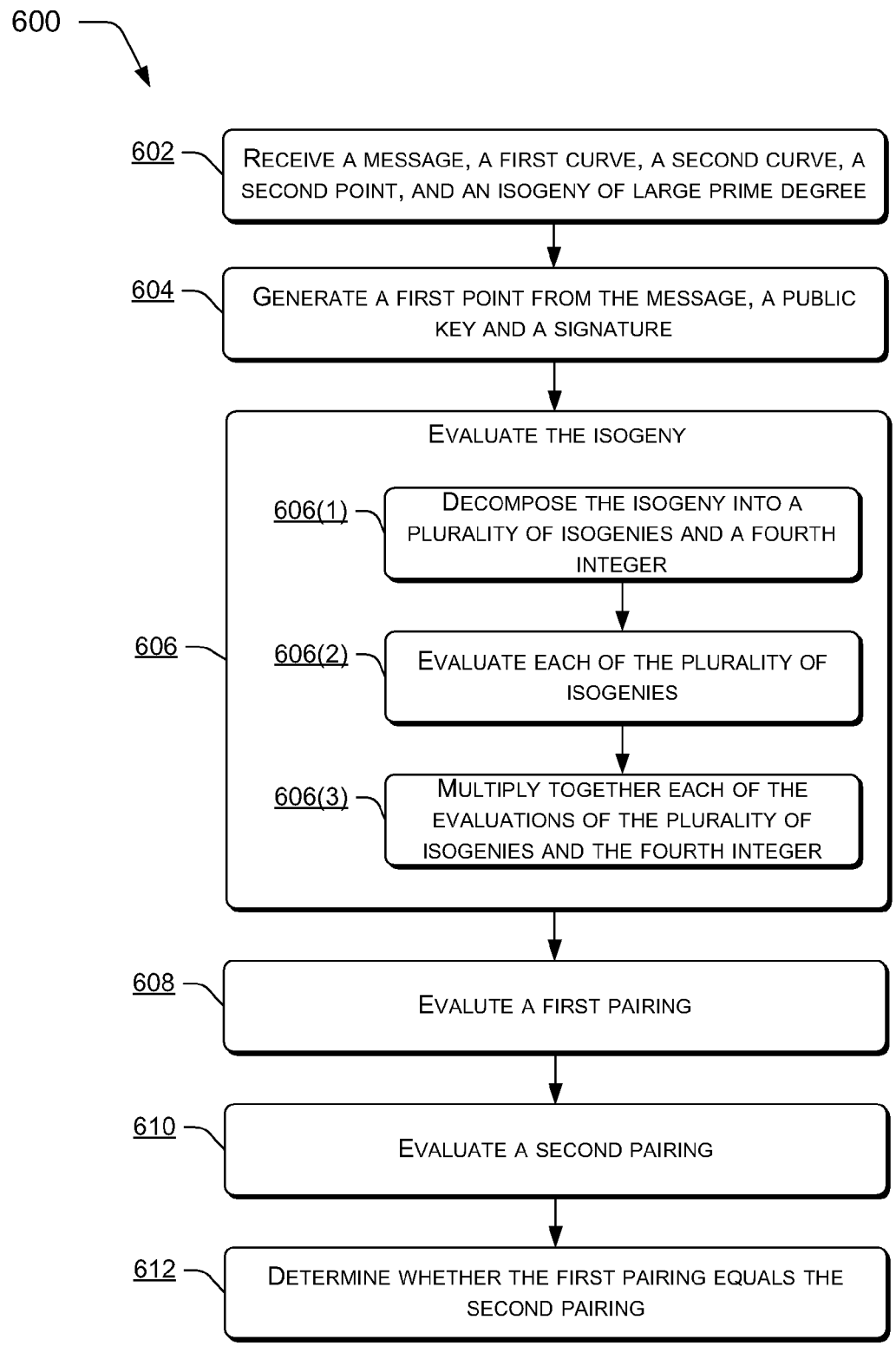
FIG. 6 depicts an illustrative process for representing and evaluating an isogeny to cryptographically verify a signed message

FIG. 6 depicts an illustrative process 600 for representing and evaluating an isogeny to cryptographically verify a signed message. At operation 602, data necessary to sign a message is received. In one embodiment, a message to be signed, a first curve, a second curve, a second point on the second curve, and an isogeny of large prime degree are all received.

At operation 604, a first point may be generated from the message by hashing the message onto a point on the first curve. Additionally, a public key may be generated by multiplying a private key with the second point, and a signature may be generated by multiplying a private key with the first point.

At operation 606, the isogeny may be evaluated by performing operations 606(1) to 606(3). At operation 606(1), the isogeny may be decomposed into a plurality of component isogenies multiplied together, and a fourth integer. At operation 606(2), each of the plurality of isogenies may be evaluated. In one embodiment, the isogenies are evaluated by converting each isogeny to a polynomial representation and using traditional means of evaluation. At operation 606(3), each of the evaluations of the operation 610 may be multiplied together, and multiplying the result by the fourth integer.

At operation 608, a first bilinear pairing is evaluated. The first pairing comprises an evaluation of the isogeny at the first point, and a public key. The first pairing may be a Weil pairing, a Tate pairing, a squared Weil pairing, or a squared Tate pairing.

At operation 610, a second bilinear pairing is evaluated. In one embodiment, the second pairing comprises an evaluation of the isogeny at the signature, and the first point. The second pairing may be a Weil pairing, a Tate pairing, a squared Weil pairing, or a squared Tate pairing.

At operation 612, the first and second pairings are evaluated to determine whether the sender of the message is verified. The sender is verified when the first and second pairings are equal.

Figure 7:
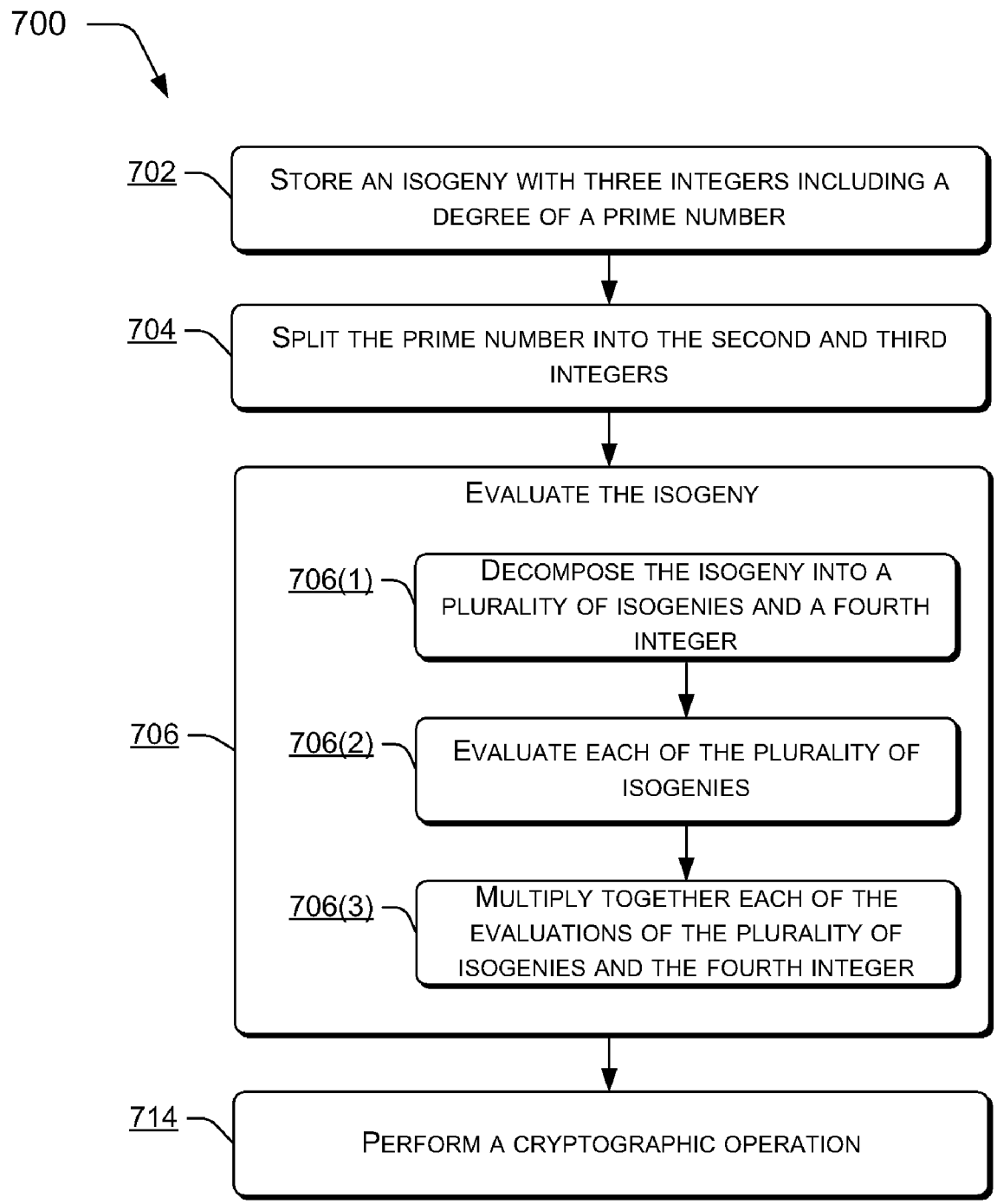
FIG. 7 depicts an illustrative process for representing and evaluating an isogeny to perform a cryptographic operation.

FIG. 7 depicts an illustrative process 700 for representing and evaluating an isogeny to perform a cryptographic operation. At operation 702, an isogeny is represented and stored with three integers, each of degree 1, requiring 3 log(1) bits. The first of the three integers may be a prime number of degree 1.

At operation 704, the prime number of degree 1 is split into a second and third integer given the constant alpha. Given alpha and the second and third integers, an isogeny of degree 1 may be uniquely defined.

At operation 706, the isogeny is evaluated at the point by performing operations 706(1) to 706(3). At operation 706(1), the isogeny is decomposed into a plurality of isogenies and a fourth integer. In one embodiment, each of the plurality of isogenies may have relatively small prime degrees. At operation 706(2), each of the plurality of isogenies of relatively small prime degrees are evaluated. In one embodiment, these isogenies are first converted to a polynomial representation, or "kernel", before evaluation. At operation 706(3), the results of the evaluation of each of the plurality of isogenies of relatively smaller prime degree are multiplied together, and the result may be further multiplied by the fourth integer.

At operation 708, a cryptographic operation is performed. In one embodiment, the cryptographic operation comprises encrypting a message.

Figure 8:
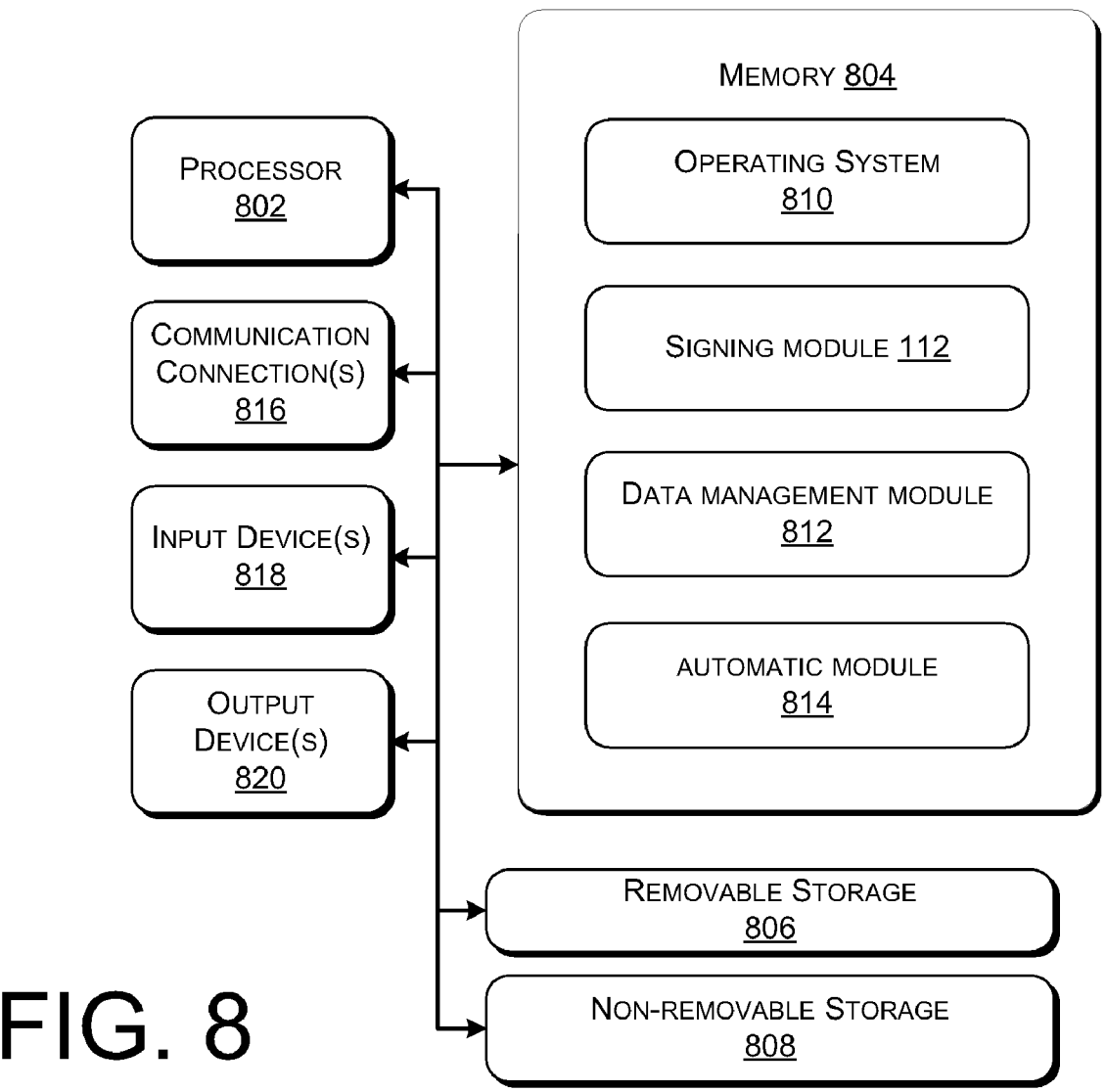
FIG. 8 depicts an illustrative processing functionality to create a signing module.

FIG. 8 illustrates an exemplary processing functionality 800 to create a signing module 112. A signing module in one instance utilizes an isogeny represented by an ideal in the form (1, A*alpha+B), and evaluates the isogeny by decomposing the isogeny into an integer and a plurality of isogenies of smaller degree, evaluating the isogenies of smaller degree, and multiplying the resulting values together and with the integer. The processing functionality 800 may be configured as any suitable computing device or server capable of implementing a isogeny representation and evaluation module. In one exemplary configuration, the processing functionality 800 comprises at least one processing unit 802 and memory 804. The processing unit 802 may be implemented as appropriate in hardware, software, firmware, or combinations thereof. Software or firmware implementations of the processing unit 802 may include computer- or machine-executable instructions written in any suitable programming language to perform the various functions described.

Memory 804 may store programs of instructions that are loadable and executable on the processor 802, as well as data generated during the execution of these programs. Depending on the configuration and type of computing device, memory 804 may be volatile (such as RAM) and/or non-volatile (such as ROM, flash memory, etc.). The computing device or server may also include additional removable storage 806 and/or non-removable storage 808 including, but not limited to, magnetic storage, optical disks, and/or tape storage. The disk drives and their associated computer-readable media may provide non-volatile storage of computer readable instructions, data structures, program modules, and other data for the computing devices.

Memory 804, removable storage 806, and non-removable storage 808 are all examples of computer storage media. Computer storage media includes volatile and non-volatile, removable and non-removable media implemented in any method or technology for storage of information such as computer readable instructions, data structures, program modules or other data. Memory 804, removable storage 806, and non-removable storage 808 are all examples of computer storage media. Additional types of computer storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the server or other computing device.

Turning to the contents of the memory 804 in more detail, the memory 804 may include an operating system 810 and one or more application programs or service for representing and evaluating isogenies, which may be of a large prime degree. In one implementation, the memory 804 includes a data management module 812 and an automatic module 814. The data management module 812 includes but is not limited to identifying and tracking a session. The automatic module 814 stores and manages information, such as session identifier, session state, computing devices of the user, and the like, and may communicate with one or more local and/or remote databases or services.

The memory 804 further includes a user interface module 816 and a session module 818. The user interface module 816 presents the user with the user interface to log in or log off, in and out of a session, and the like. The session module 818 includes but is not limited to, tracking a state of the computing devices, logging in or logging off, connecting or disconnecting, and the like. The session module 818 performs connections, disconnections, search functions, such as performing searches to identify the client devices that are logged on, logged off, state of the client devices, the status of the user, and the like.

The processing functionality 800 may also contain communications connection(s) 816 that allow the processing functionality 800 to communicate with a stored database, another computing device or server, the user terminals, and/or other devices on the network. Communications connection(s) 816 is an example of communication media. Communication media typically embodies computer readable instructions, data structures, and program modules. By way of example, and not limitation, communication media includes wired media such as a wired network or direct-wired connection, and wireless media such as acoustic, RF, infrared and other wireless media. The term computer readable media as used herein includes both storage media and communication media.

The processing functionality 800 may also include input device(s) 818 such as a keyboard, mouse, pen, voice input device, touch input device, etc., and output device(s) 820, such as a display, speakers, printer, etc. The processing functionality 800 may include a database hosted on the processing functionality 800 including, but is not limited to, session data, network addresses, list of computing devices, and the like. All these devices are well known in the art and need not be discussed at length here.

The subject matter described above can be implemented in hardware, or software, or in both hardware and software.

Although the subject matter has been described in language specific to structural features and/or methodological acts, it is to be understood that the subject matter defined in the appended claims is not necessarily limited to the specific features or acts described above. Rather, the specific features and acts are disclosed as exemplary forms of implementing the claimed subject matter. For example, the methodological acts need not be performed in the order or combinations described herein, and may be performed in any combination of one or more acts.

Conclusion

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

What is claimed is:

1. A computer-implemented method for cryptographically signing a message performed by one or more processors, comprising:
    under control of one or more computing systems comprising the one or more processors,
        storing a first integer, a second integer, and a third integer to represent a first isogeny, wherein:
            the first integer comprises a prime number comprising a degree of the first isogeny, and
            the second and third integers are calculated by splitting the prime number in a quadratic extension field;
        determining a first curve;
        determining a second curve by applying the first isogeny to the first curve;
        computing a hash of the message onto a first point on the first curve;
        determining a second point on the second curve;
        defining a second isogeny corresponding to a dual isogeny of the first isogeny, the second isogeny mapping the second curve to the first curve;
        storing the second isogeny;
        generating a public key by evaluating the second isogeny at the second point;
        generating a signature by evaluating the first isogeny at the first point, the evaluating comprising evaluating the isogeny by:
            decomposing the isogeny into a plurality of isogenies and a fourth integer,
            evaluating each of the plurality of isogenies,
            composing each of the evaluations of the plurality of isogenies to find a result, and
            applying endomorphism to the result; and
        making available the message, the signature, the first point, and the evaluation of the second isogeny at the second point.

2. The computer-implemented method of claim 1, further comprising normalizing the isogeny.

3. The computer-implemented method of claim 1, wherein the prime number is split with respect to a Frobenius endomorphism.

4. The computer-implemented method of claim 1, wherein the first integer is greater than $2^{50}$.

5. The computer-implemented method of claim 1, wherein the isogeny maps a first curve to a second curve.

6. The computer-implemented method of claim 1, wherein the first integer, the second integer, the third integer, and a Frobenius endomorphism comprise an ideal in a form of (the first integer, the second integer*the Frobenius endomorphism+the third integer).

7. The computer-implemented method of claim 1, wherein the second integer and the third integer determine which isogeny having the degree of the first integer is stored.

8. The computer-implemented method of claim 1, wherein the fourth integer is determined by dividing an endomorphism, derived from the plurality of isogenies, by a product of norms of the plurality of isogenies.

9. One or more computer-readable hardware storage media storing computer-executable instructions that, when executed on one or more processors, perform acts comprising:
    receiving a message;
    receiving a first curve defined over a finite field;
    receiving a second curve defined over the finite field;
    receiving a first point on the first curve calculated by hashing the message onto the first curve,
    receiving a second point on the second curve;
    receiving a public key generated by multiplying a private key with the second point,
    receiving a signature generated by multiplying the private key with the first point, and
    receiving an isogeny having a prime degree mapping the first curve to the second curve, wherein the isogeny is represented with: an ideal comprising a prime number, and a first integer and a second integer generated by splitting the prime number in a quadratic field with respect to a Frobenius endomorphism;
    evaluating the isogeny at the first point and evaluating the isogeny at the signature, wherein the evaluating comprises:
        decomposing the isogeny into a plurality of isogenies and a third integer representing an endomorphism of the curve,
        evaluating each of the plurality of isogenies, and
        composing the evaluations of the plurality of isogenies and the integer;
    evaluating a first pairing comprising: an evaluation of the isogeny at the hash of a message, and a public key;
    evaluating a second pairing comprising: an evaluation of the isogeny at the signature, and a public key;
    determining whether the first pairing is equal to the second pairing; and
    responsive to determining that the first pairing being equal to the second pairing, indicating that the message was signed with the private key,
    otherwise, indicating the message was not signed with the private key.

10. The one or more storage media as recited in claim 9, wherein evaluating each of the plurality of isogenies comprises converting each of the plurality of isogenies into a polynomial form.

11. The one or more storage media as recited in claim 9, wherein the first pairing comprises a Weil pairing.

12. The one or more storage media as recited in claim 9, wherein the public key is computed by evaluating secret isogeny at the second point.

13. The one or more storage media as recited in claim 9, wherein the prime degree is greater than $2^{50}$.

14. A system comprising:
    one or more processors; and
    one or more computer readable media comprising computer-executable instructions that, when executed by the one or more processors, perform acts comprising:
        storing a first isogeny with a first integer, a second integer, and a third integer, wherein:

the first integer comprises a prime number, and
the prime number is split in a quadratic extension field into the second and third integers;
determining a first curve;
determining a second curve by applying the first isogeny to the first curve;
computing a hash of a message onto a first point on the first curve;
determining a second point on the second curve;
defining a second isogeny corresponding to a dual isogeny of the first isogeny, the second isogeny mapping the second curve to the first curve;
storing the second isogeny;
generating a public key by evaluating the second isogeny at the second point;
generating a signature by evaluating the first isogeny at the first point, the evaluating comprising evaluating the isogeny by:
  decomposing the isogeny into a plurality of isogenies and a fourth integer,
  evaluating each of the plurality of isogenies, and
  composing the plurality of isogenies and the endomorphism; and
evaluating the isogeny at a point to perform a cryptographic operation on the message; and
making available the message, the signature, the first point, and the evaluation of the second isogeny at the second point.

15. The system of claim 14, wherein the cryptographic operation comprises encrypting the message.

16. The system of claim 14, wherein the cryptographic operation comprises encrypting the message via symmetric key encryption.

17. The system of claim 14, wherein the cryptographic operation comprises decrypting the message.

18. The system of claim 14, wherein the cryptographic operation comprises anonymous credential generation, attribute-based encryption, or tri-partite Diffie-Hellman calculation.

19. The system of claim 14, wherein the isogeny is represented by an ideal in a form of (the first integer, the second integer*Frobenius endomorphism+the third integer).

* * * * *